Patented July 15, 1952

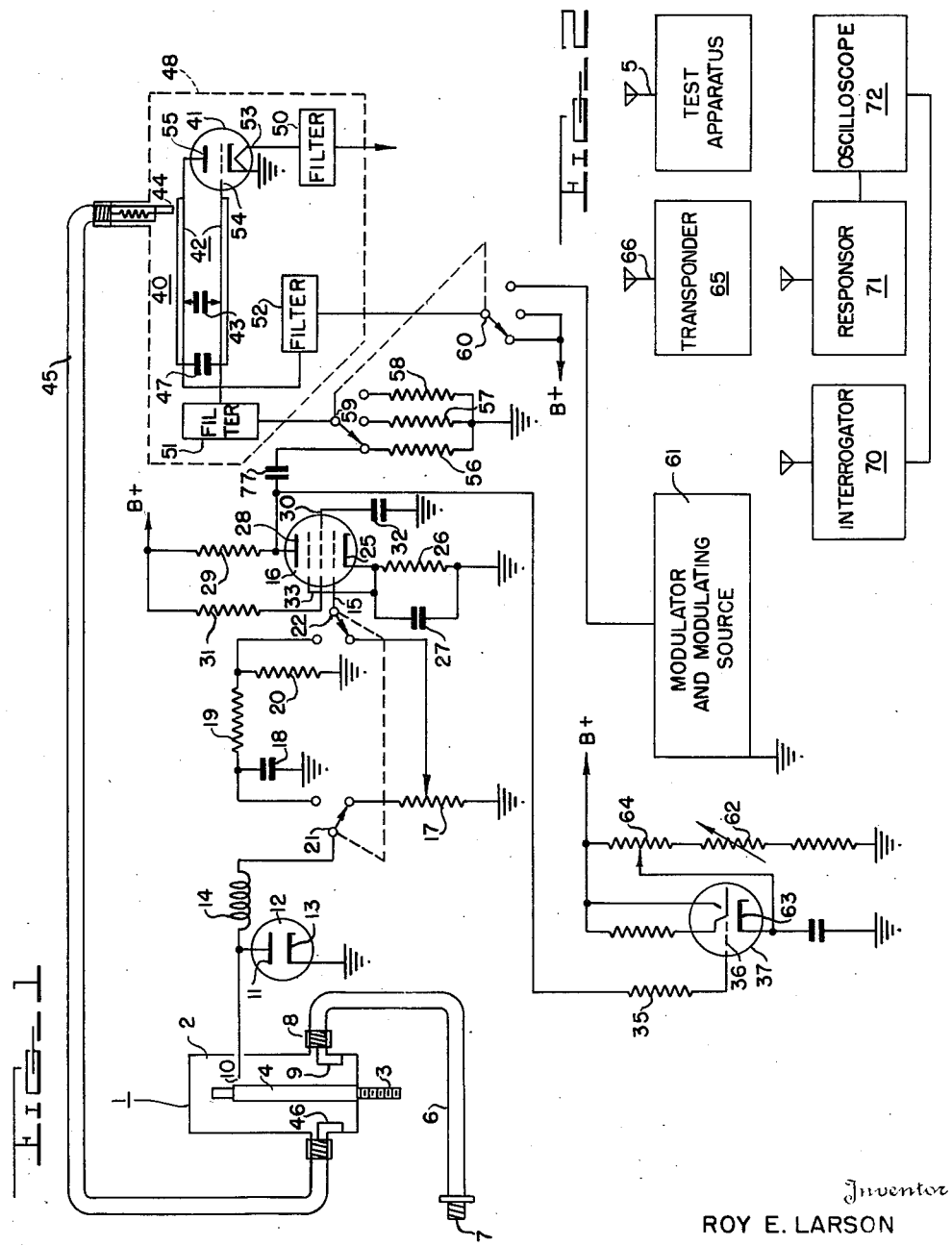

2,603,742

UNITED STATES PATENT OFFICE 2,603,742

ELECTRICAL APPARATUS FOR TESTING RADIO EQUIPMENT

Roy E. Larson, United States Navy

Application May 31, 1945, Serial No. 596,933

11 Claims. (Cl. 250—13)

(Granted under the act of March 3, 1883, as amended April 30, 1928; 370 O. G. 757)

This invention relates to an electrical testing apparatus, and more particularly to an electrical testing apparatus whereby the sensitivity and the frequency calibration of receivers, and the power output and frequency of transmission of transmitters may be determined.

In the operation and maintenance of most electronic equipment it is essential to know something of the operating performance of the equipment. For example, in certain radio systems which incorporate both a receiver and a transmitter controlled by the receiver, it is necessary to know both the sensitivity and frequency calibration of the receiver and the frequency calibration and power output of the transmitter. Ordinarily the performance of the equipment may be indicated by the use of several different types of apparatus. It is, however, desirable to reduce the amount of required test equipment to a minimum by employing multiple function test equipment.

An object of the present invention is to provide a simple and effective electrical testing apparatus whereby the sensitivity and frequency calibration of receivers, and the power output and frequency calibration of transmitters may be determined.

Other objects and advantages of the present invention will be apparent from the following detailed description taken in conjunction with the drawing, wherein:

Fig. 1 is a schematic view of a circuit constructed in accordance with one embodiment of this invention; and Fig. 2 shows diagrammatically a radio system, the operation of which may be tested by the present apparatus.

Referring now to the drawing and particularly to Fig. 1 thereof, wherein a preferred embodiment of the invention is shown, it will be seen that this testing apparatus includes a resonant circuit having associated therewith means for indicating when the circuit is tuned to resonance with a signal applied thereto. This resonant circuit comprises a calibrated wave meter 1, which is here represented as being of the coaxial line type, formed by a metal cylinder 2, having coaxially disposed therein a portion of a longitudinally adjustable, micrometer tuning shaft 3 whereby the resonant frequency of the wavemeter may be varied. The tuning shaft 3 is carried by a sleeve 4, one end of which is suitably mounted in an end wall of the cylinder, 2.

The frequency of signals applied to the apparatus shown in Fig. 1 may be measured by applying to the wavemeter the signals received from an antenna (not shown) but which may be connected to a coaxial transmission line having an outer tubular conductor 6 and an inner, coaxially disposed conductor 7, or by directly coupling the output of the device being tested to the coaxial line. The transmission line outer conductor is connected through a suitable coupling 8 to the wall of the cylinder 2, while the inner conductor 7 extends into the resonant chamber formed by the cylinder 2, the portion of the inner conductor which extends into the chamber being suitably formed to provide a loop 9 whereby energy from the line is effectively coupled to the wavemeter.

A probe 10 also extends into the resonant chamber and is remotely located from loop 9 so that when the chamber is tuned to resonance with an applied signal, probe 10 couples a portion of the energy in the chamber to a plate 11 of a detector tube 12, cathode 13 of which is connected to ground. This tube operates as a rectifier and acts to cut-off the positive halves of the applied signals and to apply the negative halves through a radio frequency choke 14 to a grid 15 of a suitable amplifier tube 16.

Two alternate paths are provided between the choke 14 and the grid 15, one comprising a path through a voltage dividing resistor 17, one end of which is connected to ground, and the other path comprising a filter circuit having a shunt capacitor 18, a series resistor 19, and a shunt resistor 20, the values of which are so selected as to provide a long time constant circuit. When the negative halves of the received signals are applied through the path provided by the resistance 17, the strength of the signals may be varied by adjusting the movable arm on the resistance. On the other hand, when the negative halves of the signals are applied to the filter circuit, by changing the position of two ganged switches 21 and 22 from that shown to their alternative position, the peak D. C. level of the applied signals is supplied to the grid 15.

While any suitable type of amplifier tube may be employed with this test apparatus, it has been found that the pentode type tube provides a most satisfactory operation. Accordingly, a pentode tube 16 is illustrated and includes a cathode 25 having a cathode resistor 26, one end of which is grounded, and the resistor is shunted by a by-pass condenser 27. The plate 28 of the tube is connected through a resistor 29 to a suitable source of plate voltage, not shown, and a screen grid 30 is connected through a resistance 31 to the same voltage source. A filter condenser 32 is connected in series between this resistance and ground to smooth out the variations in power supply voltage which might otherwise adversely affect the operation of the tube. The suppressor grid 33 is connected to the cathode load to operate the suppressor grid at the same potential as the cathode.

The plate 28 of the amplifier tube 16 is connected through a resistor 35 to a control grid 36 of a sensitive, electron ray tube tuning indicator 37, or eye, such as that commercially designated as type 6E5, which provides a sharp cut-off so that the shadow angle may be closed in response to a low amplitude signal voltage. Potentiometer 64 and variable resistance 62 which are connected in series and arranged to provide an adjustment of the bias for tube 37 serve as a manual adjustment for the shadow on tuning eye 37, as hereinafter described in detail. Application of a negative potential to the grid 15 of the tube 16 causes the potential on the plate 28 to increase and thus correspondingly raises the potential on the control grid 36 of the tube 37. This increase in potential opens the tuning eye 37 indicating thereby the presence of a potential at the grid 15. Unless the wavemeter 1 is tuned to resonance with the applied signal, no signal will reach the grid 15 and consequently the eye will remain closed. Thus, the tuning indicator 37 may be employed to indicate when the wavemeter has been tuned to resonance. It is also feasible to obtain an indication of the amplitude of the applied signal by employing this indicator in combination with the wavemeter as will be hereinafter explained.

In order to provide for testing the operation of receivers, the present apparatus incorporates a high frequency oscillator which may comprise a triode oscillator tube 41 and a two-wire resonant line 42, suitably enclosed within a shielded container indicated in general at 48. In the embodiment illustrated, the frequency of the oscillator is adjusted by varying the position of a radio frequency shorting condenser 43, connected across the two wire line 42 and slidable there along to vary the resonant frequency of the line. A grid blocking condenser 47 is connected across the end of the line 42 more remote from the tube 41 and terminates the resonant line. A pick up loop 44 or probe is located adjacent the resonant line 42 and is connected to one end of a coaxial transmission line 45, the other end of which is connected to the wavemeter 1. The loop is movable toward or away from the line to increase or to decrease the coupling there between. The loop thus serves both as a coupling device and an attenuator. The portion of the inner conductor 46 of the coaxial line 45 which is disposed within the wavemeter 1 is bent into the shape of a loop 46, similar to the loop 9 and positioned adjacent thereto to provide coupling between the two associated coaxial transmission lines irrespective of the tuning of the wavemeter 1.

Radio frequency filters 50, 51 and 52 are respectively associated with the heater element 53, control grid 54 and plate 55 of the tube 41. Because of the relatively high impedance of the ground path at the high frequencies at which this apparatus is intended to operate, radio frequency energy from the oscillator might reach the heater power supply. However, by providing the filter 50, the heater power supply is effectively isolated from such radio frequency currents.

The filter 51 isolates the radio frequency on the plate 55 from the power supply and the filter 52 isolates the high frequency currents on the grid 54 from the substantially lower frequency signal applied from the tube 16 as will hereinafter be explained.

The high frequency oscillator normally functions as a self pulsing oscillator operating with a pulse repetition rate in the audio frequency range and in this condition the grid is connected through either a resistance 56 or a higher resistance 57 to ground, resistances 56 and 57 providing different repetition rates, or selecting a third resistance 58, by operating associated ganged selector switches 59 and 60, the high frequency oscillator may be made to oscillate continuously to provide a continuous carrier wave which may be modulated from a suitable modulator and modulating source 61.

In testing the operation of a receiver with this apparatus, the output of the oscillator is applied to the receiver through the transmission line 45, the wave meter 1, and the wave meter input transmission line, either through an antenna connected to the central conductor 7 of the transmission line or the transmission line may be directly connected to the receiver. The frequency of oscillation of the oscillator is determined by tuning the calibrated wave meter 1 to resonance as indicated by the presence of a shadow on the tuning eye 37, the frequency of the oscillator being then read directly from the calibrations on the wave meter. The frequency setting of the receiver may then be compared with the frequency setting of the wave meter, and calibrated accordingly.

The sensitivity of a receiver may also be determined by employing the oscillator. The oscillator is again set in operation and the probe 44 adjusted (moved away from the line 42) to decrease the signal applied to the receiver to the minimum detectable strength as indicated by monitoring the repetition rate of oscillator by a suitable audio reproducing device connected to the output of the receiver. The setting of the calibrated attenuator is then a direct indication of the sensitivity of the receiver.

In testing the operation of a transmitter, the output of the transmitter may be coupled to the wave meter 1 through the transmission line 6, and may be applied thereto by an antenna 5 associated with the wavemeter as shown in Fig. 2. The wave meter is tuned to resonance with the applied signal, resonance being indicated by the indicator tube 37, and the frequency is noted. With no signal being applied to the tube 37 the variable resistor 62 is adjusted until the eye is just closed. Upon receipt of a signal from the transmitter the eye will be opened an amount depending upon the power of the transmitter's signal. Then with a signal being received, the potentiometer 64 is adjusted until the eye is again just closed, the adjustment of the potentiometer which is required to close the eye being a direct indication of the relative power of the transmitter as compared with other similar transmitters.

In testing the operation of a radio system comprising a receiver and a transmitter triggered thereby, designated as a transponder 65 and illustrated in Fig. 2, a similar procedure to that employed in testing a receiver and a transmitter separately may be used. The transponder has associated therewith an antenna 66, used with both the receiver and transmitter sections thereof, while the test apparatus of the invention, illustrated in block form, is provided with the antenna 5. The ganged switches 59 and 60 are thrown into the position illustrated in Fig. 1 wherein switch 59 connects the grid 54 to the resistance 56 or to the resistance 57, according to the desired repetition rate. The tuning of the high frequency oscillator is then adjusted by moving the tuning element 43 until the oscillator is tuned to the frequency of the receiver in the transponder unit 65. When the receiver calibration is known and the setting of the receiver is known, the wave meter 1 may be first adjusted to the receiver frequency and the high frequency oscillator tuned to obtain maximum shadow on the electron ray tube indicator 37. The probe 44 is, of course, initially set to provide maximum coupling between the oscillator 40 and the transmission line 45.

The signal received at the transponder receiver, if the oscillator is correctly tuned and the output of sufficient strength, will trigger the transponder transmitter, and the signal from the transmitter will be picked up by the antenna 5 and applied to the wave meter 1. Where the transmitter and receiver of the transponder 65 do not operate on the same frequency, the wave meter 1 is now readjusted to the frequency of transmission of the transmitter, the coupling between the loops 46 and 9 being substantially unaffected by the tuning of the wave meter. In this manner the frequency of transmission is accurately determined. Switches 21 and 22 are connected to the filter circuit comprising the condenser 18 and resistors 19 and 20 so as to apply the peak D. C. level of the signal being received at the wave meter to the grid 15. The cathode voltage level control resistor 62 of the electron ray tube indicator circuit, which is connected in series with potentiometer 64 is then adjusted until the eye 37 is just closed with no signal being received. Upon receipt of a signal from the transmitter, the eye will be opened an amount depending upon the peak power of the transmitted signal. While a signal is being received, the potentiometer 64 of the electron ray tube is adjusted until the eye is just closed again, the adjustment of the potentiometer 64 required to close the eye being then a direct indication of the relative power of the transponder transmitter as compared with other similar transmitters.

The sensitivity of the transponder receiver may be determined by adjusting the coupling between attenuator probe 44 and the resonant line 42 toward minimum output signal until the receiver just begins to fail to trigger the transmitter as determined by a flickering operation of the tuning eye 37. The point at which the triggering begins to miss will be a measure of the relative sensitivity of the receiver as indicated by the required adjustment of the probe 44, which is as hereinbefore stated, calibrated. Similarly the sensitivity of the receiver to a modulated signal may be measured by changing the position of the ganged switches 59 and 60 to connect the resistor 58 into the grid control circuit of the tube 41, where continuous operation of the oscillator results, and to connect the modulator 61 to the plate 55. The position of the attenuator assembly 44 is again adjusted until the receiver 58 just fails to trigger the transmitter. The position of the attenuator at this condition is then a measure of the sensitivity of the receiver to a modulated signal.

The present test apparatus may also be employed to test the components of a radio recognition system such as that diagrammatically illustrated in Fig. 2. Such a system may comprise an interrogator 70, or transmitter, the signal from which is received by the transponder 65 causing the transponder 65 to transmit a reply which is received by a responsor or receiver 71. As indicated in Fig. 2 the responsor may be connected to a cathode ray oscilloscope 72 to apply the received signal to the indicating screen thereof. The sweep or time base of the cathode ray oscilloscope may be synchronized with the transmission of the interrogating signal from the interrogator 70. Such a system as that outlined and illustrated in Fig. 2 is principally used as a radio recognition system or navigational aid system. Ordinarily, both for reasons of security and for efficient utilization of available power, such systems utilize pulse type signals. While the frequency calibration of the responsor 71 may be determined in the same way as the frequency calibration of receivers as hereinbefore described, in testing the interrogator responsor portion of the system a somewhat different procedure may be employed from that used in testing the transponder portion.

In determining the sensitivity of the responsor, the high frequency oscillator 40 is set on the responsor frequency and placed in self pulsing condition, as hereinbefore described. The responsor then receives the oscillator signals and these are applied to the cathode ray oscilloscope 72 which is connected to the responsor. The position of the attenuator probe 44 is then adjusted until no signal appears above the noise level on the oscilloscope. The setting of the attenuator probe is then an indication of the sensitivity. The pulse output of the oscillator may, of course, be changed to a continuous wave and modulated from the modulator and modulation source 61 where desired or the repetition rate may be changed.

In testing the frequency of the interrogator 70, the wave meter 1 is tuned to the frequency of the interrogator, the tuning eye being used to indicate resonance and the setting of the wave meter 1 is then an indication of the frequency of the interrogator.

While the power output of the interrogator may be readily determined as hereinbefore described in the testing of a transmitter of standard design, another method of measuring the relative power of a transmitter used as an interrogator in a system such as that shown in Fig. 2 is available in accordance with the present invention. In accordance with this method, the high frequency oscillator is set on the responsor frequency and placed in self-pulsing condition, as hereinbefore described. The responsor then receives the pulse signals and applies them to the cathode ray oscilloscope 72 connected to the responsor. The wavemeter 1 is now tuned to the transmitting frequency of the interrogator, and the received interrogator signal is presented to the amplifier grid 15 of the tube 16 through the resistor 17, the ganged switches 21 and 22 being adjusted as shown in Fig. 1. With switch 59 connected to the resistor 56 the plate voltage of the tube 16 is coupled through a coupling condenser 77 to the grid 54 of the triode tube 41 and applies the output of the amplifier tube 16 to the grid 54. The signal from the interrogator transmitter 70 is applied to the grid 15 of the tube 16 and inverted in polarity as well as amplified at the plate 28 of the tube 16 and consequently a positive pulse is applied to the grid 54. The amplified and inverted pulse signal from the interrogator will cause the grid 54 of the oscillator 40 to draw grid current, thus charging condenser 47 to cause the oscillator tube 41 to stop its self pulsing action for a period of time dependent upon the amplitude of the pulse sent to the grid 54 and the time constant of the R-C circuit formed by the filter 51 and the resistor 56 and condenser 47. Since the sweep of the oscilloscope 72 is synchronized with the transmitter pulse, being triggered thereby as hereinbefore stated, it will be understood that the stopping of this pulsing action of the oscillator and the beginning of the sweep on the oscilloscope 72 occur at the same instant. Thus the later starting of the high frequency oscillator will appear as a pip a fixed distance from the beginning of the sweep on the oscilloscope according to the delay period in the operation of the oscillator, which depends upon the power output of the transmitter 70. The distance between the start of the sweep and the appearance of the pip is a direct indication of the power of the interrogator.

It will be apparent from the foregoing that in accordance with this invention a unique electrical testing apparatus has been provided combining in a single apparatus many of the functions heretofore available only by employing numerous separate testing equipments. It will be understood, however, that while a specific embodiment has been shown and described, many changes and modifications may be made therein without departing from the spirit or scope of the present invention.

The invention described herein may be manufactured and used by or for the Government of the United States of America for governmental purposes without the payment of any royalties thereon or therefor.

What is claimed is:

1. In an apparatus for testing a radio system including a pulse transmitter triggered by a receiver, a pulse signal generator for producing a signal suitable to cause the receiver of said radio system to trigger the transmitter, means coupled to said signal generator for determining the output frequency of said generator, means coupled to said signal generator for attenuating the output energy of said generator, and means coupled to said frequency measuring means for measuring the power of the signal transmitted by said transmitter.

2. In an apparatus for testing a radio system including a transmitter, a receiver, and a cathode ray tube indicator associated with said receiver, a vacuum tube oscillator circuit, means for applying the output of said oscillator circuit to said receiver to cause a deflection on said indicator, said indicator having a time base synchronized with the operation of said transmitter, and means responsive to an output signal from said transmitter for blocking the operation of said oscillator, the duration of the blocking period being a function of the power output of said transmitter.

3. In an apparatus for testing a radio system including a transmitter, a receiver, and a cathode ray tube indicator associated with said receiver and having a time base synchronized with the operation of said transmitter, a vacuum tube oscillator having at least one control grid associated therewith, means for applying the output of said oscillator to said receiver to provide an indication on said indicator, and means for applying a transmitted signal from said transmitter to the control grid of said oscillator, said means including a rectifier circuit, an amplifier circuit associated with said rectifier for amplifying and inverting said rectifier output, and a charging circuit for applying the output of said amplifier to said control grid, whereby the operation of said oscillator is stopped for a period of time depending upon the power output of said transmitter.

4. In an apparatus for testing an interrogator responser system having an oscilloscope type indicator associated with the responser, the time base of said oscilloscope being synchronized with the operation of said interrogator, a vacuum tube oscillator having a control grid associated therewith, means for applying the output of said oscillator to said responser to provide an indication on said indicator, and means for apply a transmitted signal from said interrogator to the control grid of said oscillator, the last-named means including a rectifier circuit, an amplifier circuit associated with said rectifier for amplifying and inverting said rectifier output, and a coupling circuit connected between said amplifier and said control grid, said coupling circuit having a long time constant discharge rate.

5. In an apparatus for testing an interrogator responser system having an oscilloscope type indicator associated with the responser, the operation of the indicator being synchronized with the operation of the interrogator, a vacuum tube oscillator having a control grid associated therewith, means for applying the output of said oscillator to said responser to provide an indication on said indicator, a rectifier circuit associated with said oscillator, means for applying said interrogator signal to said rectifier, an amplifier circuit for amplifying and inverting said rectifier output, and a coupling circuit connected between said amplifier and said control grid having a long time constant discharge rate, whereby the rectified, amplified, and inverted signal from said interrogator is caused to block the operation of said oscillator for a period corresponding to the transmitted power of said interrogator.

6. In an apparatus for testing a transponder system having a transmitter associated therewith triggered by a receiver portion of said transponder, a resonant chamber tunable to the frequency of said transmitter, means associated with said resonant chamber for indicating when said resonant chamber is tuned to resonance with an applied signal, a vacuum tube oscillator having a control grid associated therewith, means for coupling the output of said oscillator to said resonant chamber, means for connecting said resonant chamber to said transponder, the frequency of said oscillator being selected to cause the receiver of said transponder system to trigger the transmitter, a voltage polarity inverting means associated with said resonant chamber, means associated with said resonant chamber for applying transmitted signal to said inverting device, and means for applying said inverted signal from said transmitter to the control grid of said oscillator to cause said oscillator to cease oscillating for a period of time determined by the amplitude of the received signal.

7. In an apparatus for testing a radio system including a transmitter, a receiver and an indicator associated with said receiver, a signal generator, means applying the output of said generator to said receiver so that an indication thereof is produced on said indicator and blocking means for said generator responsive to said transmitter signal output for blocking said generator for a period of time determined by the amplitude of said signal output.

8. In an electrical testing apparatus, a calibrated wavemeter, a plurality of coupling means located closely adjacent to one another and associated with said wave meter for applying energy thereto and for transferring energy therebetween, output means coupled to said wavemeter for extracting energy therefrom of a frequency corresponding to the resonant frequency thereof, and remotely located with respect to said coupling means a signal generator, and means applying the output of said signal generator to said wavemeter in energy transferring relationship with said coupling means irrespective of the tuning of the wavemeter.

9. In an electrical testing apparatus, a calibrated wavemeter, coupling means associated with said wavemeter for applying energy thereto and for extracting energy therefrom, output means associated with said wavemeter for extracting energy therefrom of a frequency corresponding to the resonant frequency thereof, an amplifier fed by said output means, means associated with said amplifier for indicating the power of signal energy applied to said wavemeter, a signal generator, means applying the output of said signal generator to said wavemeter in energy transferring relation with said coupling means and means controlling said signal generator in accordance with the output of said amplifier.

10. In an electrical testing apparatus, a calibrated wavemeter, a plurality of coupling means located closely adjacent to one another and associated with said wavemeter for applying energy thereto and for transferring energy therebetween, output means coupled to said wavemeter and remotely located with respect to said coupling means for extracting energy therefrom of a frequency corresponding to the resonant frequency thereof, a signal generator, means controlling operation of said generator in accordance with energy extracted by said output means and means applying the output of said generator to said wavemeter in energy transferring relationship with said coupling means irrespective of the tuning of said wavemeter.

11. In combination, a signal generator, a resonator, calibrated tuning means for said resonator, first and second coupling means located closely adjacent to each other and connected to said resonator for coupling energy thereto and for transferring energy therebetween irrespective of the tuning of said resonator, connecting means between said signal generator and said first coupling means and output means coupled to said resonator and remotely located with respect to said first and second coupling means for extracting energy therefrom of a frequency corresponding to the resonant frequency thereof.

ROY E. LARSON.

REFERENCES CITED

The following references are of record in the file of this patent:

UNITED STATES PATENTS

| Number | Name | Date |
| --- | --- | --- |
| 1,180,075 | Pichon | Apr. 18, 1916 |
| 1,944,315 | Clapp | Jan. 23, 1934 |
| 1,947,182 | Betts | Feb. 13, 1934 |
| 2,094,684 | Shepard, Jr. | Oct. 5, 1937 |
| 2,199,179 | Koch | Apr. 30, 1940 |
| 2,218,923 | Newhouse | Oct. 22, 1940 |
| 2,348,440 | Lavoie | May 23, 1944 |
| 2,400,597 | Peterson | May 21, 1946 |
| 2,411,553 | Ramo | Nov. 26, 1946 |
| 2,414,456 | Edson | Jan. 21, 1947 |
| 2,425,600 | Coykendall | Aug. 13, 1947 |
| 2,426,193 | Fernsler | Aug. 26, 1947 |
| 2,433,868 | Sensiper | Jan. 6, 1948 |
| 2,460,827 | Isely | Feb. 8, 1949 |

FOREIGN PATENTS

| Number | Country | Date |
| --- | --- | --- |
| 221,566 | Germany | May 3, 1910 |

OTHER REFERENCES

Radio Engineer's Handbook by Terman, page 933, 1943.